March 11, 1958 E. J. MORIN 2,826,104
CUTTING TOOL ASSEMBLY
Filed March 14, 1956

INVENTOR.
Edmund J. Morin
BY Harold E. Cole
Attorney

United States Patent Office 2,826,104
Patented Mar. 11, 1958

2,826,104
CUTTING TOOL ASSEMBLY

Edmund J. Morin, Taunton, Mass.

Application March 14, 1956, Serial No. 571,416

4 Claims. (Cl. 77—66)

This invention relates to a cutting tool, especially for spotfacing and countersinking.

One object of my invention is to provide a holding and cutting device to receive a drill, having blades with cutting edges that are integral with the body of the device, which unitary structure also enables it to be fitted to guide bushings in drill jigs or fixtures and used in multiples.

Another object is to provide such a holding device having said cutting edges which overlie the circular hole cut by the cutting edges of a straight flute drill during rotation of the tool assembly.

A further object is to provide such a cutting tool assembly in which the holding and cutting device has an oblong hole to receive the oblong cutting portion of the drill, and also has a circular hole to receive the circular shank portion of the drill, whereby said drill cannot pass entirely through said holes, is held firmly against rotation therein, and said device and drill can quickly be assembled and disassembled.

The foregoing and other objects which will appear as the nature of the invention is better understood, may be accomplished by a construction, combination and arrangement of parts such as is disclosed by the drawing. The nature of the invention is such as to render it susceptible to various changes and modifications, and therefore, I am not to be limited to the construction disclosed by the drawing nor to the particular parts described in the specification; but am entitled to all such changes therefrom as fall within the scope of my claims.

Figure 1:
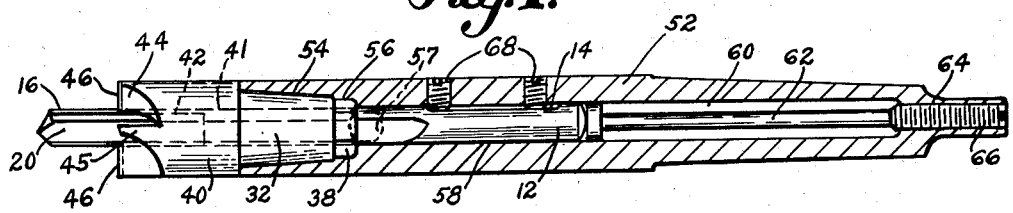
Fig. 1 is a side elevational view of my cutting tool assembly mounted in holding means.
Figure 3:
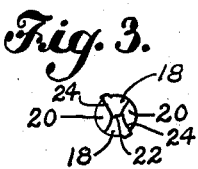
Fig. 3 is an end elevational view of the cutting end of said drill.
Figure 2:
Fig. 2 is a side elevational view of the drill used in my assembly.
Figure 5:
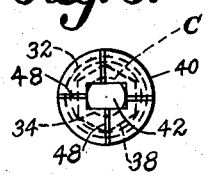
Fig. 5 is an end elevational view of said device shown in Fig. 4, looking at the cutting end.

As illustrated, I use a straight flute drill 10 having a shank 12 which tapers slightly and is circular in cross section, and has a flattened portion 14 for a purpose later explained. Forward of said shank is the drill cutting portion 15 which has two lands or projections 16 about 180 degrees apart. Circumferentially next to each land are two arcuate, solid surfaces 18 which are separated by two grooves or flutes 20 extending straight to the cutting portion outside end. The latter end has a narrow cutting tip 22 from which cutting edges 24 extend radially and diagonally in opposite directions to meet said lands 16, which latter serve as part of the cutting edges. These lands 16, being at the outside, determine the size of the hole that is drilled.

In cross section, the lines defining the space occupied by said cutting portion arcuate surfaces 18 and flutes 20 define a rectangle at the cutting end of this drill, the particular shape shown being oblong, which is given the numeral 26. I use the word "oblong" to mean that one side is longer than the other.

A holding and cutting device 30 has an interior opening extending longitudinally therethrough. It has a rearwardly tapering, attaching shank 32 having a circular hole 34 extending longitudinally through it. At the outside end of said shank 32 is a hexagon end 38.

Beyond said shank 32 is a cutting portion embodying a body 40 having a circular hole 41 therein which is a continuation of said circular hole 34, and in communication therewith is an oblong-shaped hole 42 which receives said drill cutting portion 15; but said drill shank 12 cannot enter because the narrow side of this hole prevents it.

Figure 4:
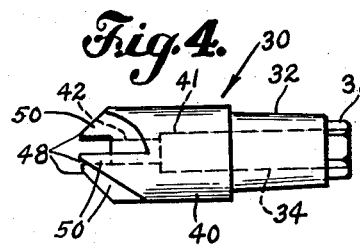
Fig. 4 is a side elevational view of a countersinking holding and cutting device used with said drill.
Figure 6:
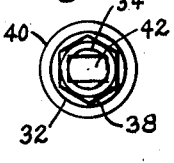
Fig. 6 is an end elevational view of the device shown in Fig. 5, looking at the rear end.

Integral with said body 40 are blades, the two shorter blades being given the numeral 44 and the two longer given the numeral 45. In Fig. 1 spot-facing cutting edges 46 are shown on each said blade 44 and 45, while in Fig. 4 cutting edges 48 of countersink blades 50 are shown. Either spot-facing or countersinking can be done with my cutting device 30.

Figure 8:
Fig. 8 is an enlarged end elevational view of the drill shown in Fig. 3, the dash lines illustrating the oblong defined by the space occupied by the cutting portion arcuate surfaces and the flutes, and the broken lines indicating the postions of the cutting blades of said device relative to said oblong.

It will be noted in Fig. 8 of the drawings that said blades 44 and 45 practically extend to the border lines of said oblong 26, there being only clearance enough between said drill cutting end and the cutting edges, whether 46 or 48, of said blades 44 and 45, to permit the drill cutting portion 15 to pass through said oblong-shaped hole 42 of the cutting device body.

Figure 7:
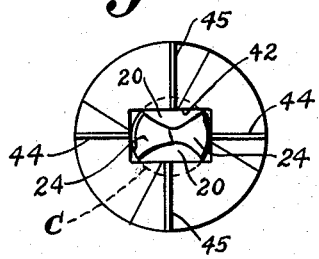
Fig. 7 is an enlarged end elevational view of the assembly shown in Fig. 1, looking at the cutting end.

When the assembly of said drill 10 and holding and cutting device 30 is rotated the drill 10 cuts in a circle as shown by the dotted line C. The two longer said blades 45 extend inwardly beyond the periphery of said circle C as shown in said Fig. 7, hence any surface roughness or irregularity left at a hole made by said drill 10 will be cleaned away by said cutting edges 46 or 48, whether spot-facing or countersinking work is being done.

This cutting work is done by an assembly having two parts only; namely, the straight flute drill 10 and the holding and cutting device 30 which receives said drill, and the work is effected by a single rotative movement.

The holding means for said assembly, as shown in Fig. 1 of the drawings, include an elongate holder 52 that has a tapered opening 54 at one end to receive said shank 32. It has another opening 56, hexagon-shaped to receive said hexagon end 38, and a drift hole 57 extends from the outside laterally inward to said opening 56. Beyond said opening 56 is a longitudinal opening 58 to receive said drill shank 12, and another opening 60 receives an adjusting rod 62 that normally bears against an end of said drill shank 12.

In another opening 64, which is screw-threaded, is an adjusting screw 66, the position of which determines the position of said drill cutting portion 15 outside said shank 32. Once this position is established, binding screws 68 are screwed beyond holes in said tool holder 52 against said flattened portion 14 of the drill shank 12. As shown in Fig. 1 of the drawing, said holder 52 and shank body 40 are of the same diameter where they meet to facilitate the use of the complete tool in drill jigs, fixtures and the like.

To remove my assembly from said holder 52, said adjusting screw 66 is removed, said binding screws 68 are loosened, the drill 10 and adjusting rod 62 are pushed farther into said holder shank 32. Then a drift can be inserted into said drift hole 57 to force said device 30 outwardly.

What I claim is:

1. A cutting tool assembly comprising a drill embodying a cutting portion having cutting edges and flutes next to said cutting edges, the space occupied by said cutting edges and flutes defining generally an oblong in cross section, said drill embodying a shank portion extending from said cutting portion that is circular in cross-section, a holding device having a longitudinally extending opening therethrough and embodying a shank having a part of said opening that is circular in cross-section and adapted to receive said circular shank portion of said drill and embodying a cutting portion at an end having therein another part of said opening that is oblong-shaped in cross-section that is adapted to receive said rectangular portion of said drill, said cutting portion of said device embodying a body and four blades integral therewith, two of said blades being longer than the remainder and extending radially inward to points adjacent the two longer sides of said oblong, whereby said longer blades will overlap the circular hole cut by the cutting portion of said drill.

2. A cutting tool assembly comprising a drill to drill a circular hole when rotated and embodying a cutting portion of general oblong shape in end view, said cutting portion embodying cutting members and having flutes between said cutting members, a shank portion extending from said cutting portion that is circular in cross-section, a holding device having a longitudinally extending opening therethrough and embodying a shank having a hole in one end portion that is circular in cross-section adapted to receive said circular shank portion of said drill and embodying a cutting portion at another end having an oblong-shaped opening therein in end view providing part of said longitudinal opening and that is adapted to receive said oblong cutting portion of said drill, said cutting portion of said device embodying a body and a plurality of blades integral therewith, one of said blades extending radially inward beyond the circumference of said circular hole.

3. A cutting tool assembly comprising a drill which when rotated, defines a circle, and embodying a cutting portion embodying cutting members and having flutes between said cutting members, the space occupied by said cutting members and flutes defining generally an oblong in end view, a holding device having a longitudinally extending opening therethrough and embodying a cutting portion having an oblong-shaped opening therein in end view providing part of said longitudinal opening, said cutting portion embodying a plurality of blades integral therewith, one of said blades extending radially inward beyond the circumference of said circle, said drill being adapted to extend through said longitudinal opening.

4. A cutting tool assembly comprising a drill embodying a cutting portion having cutting edges and flutes next to said cutting edges, the space occupied by said cutting edges and flutes defining an oblong in cross-section, said drill embodying a shank portion extending from said cutting portion that is circular in cross-section, a holding device having a longitudinally extending opening therethrough and embodying a shank having a part of said opening that is circular in cross-section and adapted to receive said circular shank portion of said drill and embodying a cutting portion at an end having therein another part of said opening that is oblong-shaped in cross-section that is adapted to receive said oblong portion of said drill, said cutting portion of said device embodying a body and a plurality of blades integral therewith of different lengths the longer of which extending radially inward to a point adjacent a longer side of said oblong whereby said longer blade will overlap the circular hole cut by the cutting portion of said drill.

References Cited in the file of this patent

UNITED STATES PATENTS

| 535,939 | Brearley et al. | Mar. 19, 1895 |
| 2,294,969 | Engvall et al. | Sept. 8, 1942 |
| 2,696,744 | Severance | Dec. 14, 1954 |

FOREIGN PATENTS

| 109,102 | Great Britain | Sept. 1, 1917 |